United States Patent
Nagasaka et al.

(10) Patent No.: US 10,751,809 B2
(45) Date of Patent: Aug. 25, 2020

(54) ELECTRICAL APPARATUS

(71) Applicant: MAKITA CORPORATION, Anjo-shi, Aichi (JP)

(72) Inventors: Hidenori Nagasaka, Anjo (JP); Tomohiko Imae, Anjo (JP)

(73) Assignee: MAKITA CORPORATION, Anjo (JP)

( * ) Notice: Subject to any disclaimer, the term of this patent is extended or adjusted under 35 U.S.C. 154(b) by 296 days.

(21) Appl. No.: 15/944,101

(22) Filed: Apr. 3, 2018

(65) Prior Publication Data

US 2018/0304380 A1 Oct. 25, 2018

(30) Foreign Application Priority Data

Apr. 19, 2017 (JP) .................................. 2017-082749

(51) Int. Cl.
  *B23B 45/00* (2006.01)
  *B23B 45/02* (2006.01)
  *H01M 2/10* (2006.01)

(52) U.S. Cl.
  CPC ........... *B23B 45/02* (2013.01); *H01M 2/1016* (2013.01); *H01M 2/1022* (2013.01); *B23B 2260/024* (2013.01)

(58) Field of Classification Search
  CPC ............. B23B 45/02; B23B 2260/024; H01M 2/1016; H01M 2/1022
  USPC ....................................................... 173/217
  See application file for complete search history.

(56) References Cited

U.S. PATENT DOCUMENTS

| 9,496,531 | B2* | 11/2016 | Hachisuka | .......... | H01M 10/425 |
| 9,713,880 | B2* | 7/2017 | Haneda | .................... | B27B 17/00 |
| 10,155,304 | B2* | 12/2018 | Ito | .............................. | H02J 7/00 |
| 2011/0197389 | A1* | 8/2011 | Ota | ........................ | H02J 7/0045 |
| | | | | | 15/339 |
| 2014/0377622 | A1* | 12/2014 | Glauning | ............... | H01M 2/204 |
| | | | | | 429/120 |
| 2015/0328763 | A1* | 11/2015 | Ito | ............................. | H02J 7/00 |
| | | | | | 451/359 |
| 2017/0110946 | A1* | 4/2017 | Oktavec | ................ | B24B 23/028 |

FOREIGN PATENT DOCUMENTS

JP     2014-148021 A    8/2014

* cited by examiner

*Primary Examiner* — Chelsea E Stinson
(74) *Attorney, Agent, or Firm* — Oliff PLC

(57) ABSTRACT

An electrical apparatus comprises an extension portion extending in a direction that intersects the direction in which a battery attachment surface of a battery base extends. A battery includes a plurality of battery cells with negative electrode side end faces. The battery has negative electrode side holding portions adjacent to the exterior of each of the negative electrode side end faces. The negative electrode side holding portions are located closer to the inner region of the center of gravity of the apparatus than a virtual plane to which a lateral rear side of the extension portion and a lateral rear side of the battery are tangent.

23 Claims, 8 Drawing Sheets

ELECTRICAL APPARATUS

CROSS-REFERENCE TO RELATED APPLICATIONS

This application claims priority to Japanese patent application serial number 2017-082749 filed Apr. 19, 2017, the contents of which is incorporated herein by reference in their entirety for all purposes.

BACKGROUND

The present disclosure relates to an electrical apparatus, for example, an angle drill used for drilling holes in a material.

An electrical apparatus generally referred to as an angle drill comprises a main housing, a gear head and a bit tool such as a drill bit. The main housing includes a motor housing which houses an electric motor serving as a power source. The drill gear head may be attached to a front portion of the main housing. The gear head supports a spindle that can rotate about an axis orthogonal to (intersecting) a motor axis. More specifically, the spindle meshes and/or engages with a bevel gear to be rotated by a motor. The bit tool is attached to the spindle by a chuck provided at the distal end of the spindle.

An axial height of the spindle is designed to be low. This may allow the electrical apparatus to be inserted into a vertically limited space for performing a drilling and/or screw tightening operation. A power source for the electrical apparatus may be a rechargeable battery that can be attached to an attachment portion provided at the main housing. Japanese Laid-Open Patent Publication No. 2014-148021 discloses an angle drill to which a plurality of rechargeable batteries can be attached. The rechargeable batteries can be attached to a battery attachment portion provided at the rear portion of the main housing.

Some electrical apparatuses, which are referred to as angle drills, generate large output torque, for example, when drilling holes of a large diameter. The main housing of such angle drills generating large output torque extends further rearward than the spindle shaft to reduce counter torque. As a result, with the housing extending further rearward, the weight of the entire electrical apparatus must increase in turn increasing the impact caused when the electrical apparatus is dropped or oscillated. Particularly, batteries, out of various components of the electrical apparatus, tend to cause troubles when they are deformed or damaged upon receiving this increased level of impact.

SUMMARY

A protection member for protecting a battery or batteries may be mounted to a heavy electrical apparatus. In this case, the following problems need to be solved. First of all, the size of the entire electrical apparatus may be increased to provide a protection member. Due to this increase in size, the usability of the electrical apparatus may be impaired and/or the weight of the electrical apparatus may be increased. The protection member may be restricted in its shape or location to be attached so as not to interfere when grasping or handling the electrical apparatus while maintaining the core functionality of protecting the batteries.

Therefore, it has been conventionally desired to provide a structure to prevent deformation or damage of the batteries by protecting batteries attached to the electrical apparatus that has a main housing with an extension portion.

According to one aspect of the present disclosure, an electrical apparatus may include a main housing for accommodating an electric motor, an output portion configured to be driven by the electric motor and to which a bit tool can be attached, and one or more battery attachment portions to which one or more batteries can be attached. The main housing may include an extension portion that extends in a direction intersecting a battery attachment surface of the one or more battery attachment portions. The extension portion may be integrally formed with the main housing.

Since the extension portion is integrally formed in one piece with the main housing, it can be produced at low cost. Further, the extension portion can be made to be lightweight.

According to another aspect of the present disclosure, the electrical apparatus may include a main housing for accommodating an electric motor, an output portion provided at a front portion of the main housing, as well as one or more battery attachment portions to which one or more batteries can be attached. The output portion may include a spindle configured to rotate about an axis intersecting a motor axis of the electric motor, where a bit tool is attached to the spindle. The spindle may mesh with a bevel gear connected to the electric motor such that the spindle can rotate in accordance with the output of the electric motor. The one or more battery attachment portions may be provided at the rear portion of the main housing. The main housing may include an extension portion that extends in a direction intersecting a battery attachment surface of the one or more battery attachment portions. The extension portion may be located on a work direction side of the bit tool with respect to the battery or batteries.

Therefore, the extension portion can protect the one or more batteries from the impact caused by hitting of the electrical apparatus to the work when the bit tool penetrates through the work.

According to another aspect of the disclosure, the electrical apparatus may include a main housing and one or more battery attachment portions to which one or more batteries can be attached. The one or more batteries may be attached to the respective one or more battery attachment portions while at least a part of the one or more batteries may be exposed. The main housing may include an extension portion that extends in a direction intersecting a battery attachment surface of the one or more battery attachment portions. The one or more batteries may have battery cells comprising their interior, and may include a negative electrode side holding portion designed to cover at least one of the negative electrode side end faces of the battery cells. The negative electrode side holding portion may be located closer to the inner region of the extension portion than a virtual plane to which both a lateral side of the extension portion and a lateral side of the battery are tangent to.

The negative electrode side end face of the battery cell is more easily deformed than any other part of the battery cell, and may be covered with the negative electrode side holding portion of the battery. The negative electrode side holding portion of the battery may be covered by the extension portion of the electrical apparatus so as to be protected. The extension portion may be configured to be relatively small in size while maintaining the above-mentioned relation between the negative electrode side holding portion and the extension portion, where the former is covered by the latter.

According to another aspect of the disclosure, the extension portion protects the one or more batteries attached to the one or more battery attachment portions. In particular, the extension portion protects an easily deformable or fragile part(s) of the one or more batteries. The extension portion may be small and lightweight because of its simple structure in which it extends from the main housing.

According to another aspect of the disclosure, a clearance space may be provided between the extension portion and the one or more batteries attached to the one or more battery attachment portions allowing a different battery or batteries of larger than normal size to be attached to the one or more battery attachment portions. In this manner, batteries in various sizes can be attached to the one or more battery attachment portions.

According to another aspect of the disclosure, the battery accommodates at least two battery cells that each include negative electrode side end faces. The battery has at least two corners wherein each negative electrode side end face may be arranged close to each of said corners. The extension portion serves to cover and protect the two corners where the negative electrode side end face is arranged. Therefore, the extension portion protects fragile battery corners as well as fortifies the structural arrangement of the easily deformable negative electrode side end faces arranged close to the battery corners.

According to another aspect of the disclosure, the electrical apparatus may include a main housing for accommodating an electric motor, an output portion configured to be driven by the electric motor, to which a bit tool can be attached, and said apparatus may also include one or more battery attachment portions to which one or more batteries can be attached. The main housing may include an extension portion that extends in a direction intersecting a battery attachment surface of the one or more battery attachment portions. The battery accommodates battery cells with negative electrode side end faces, where each of said faces may be arranged close to at least two corners of the battery respectively. The at least two corners in the proximity of which the negative electrode side end faces are arranged may be located within a spherical surface whose radius is determined from the center of gravity of the electrical apparatus up to an outermost end of the extension portion located mostly away from the center of gravity.

Accordingly, with this structural arrangement, it is possible to prevent the center of gravity of the electrical apparatus from applying excessive gravitational force on the corner of the battery in the proximity of which the negative electrode side end face is closely arranged. As a result, this arrangement prevents damage to the corners of the battery while fortifying the fragile negative electrode side end faces of the battery cells.

DETAILED DESCRIPTION

Figure 1:
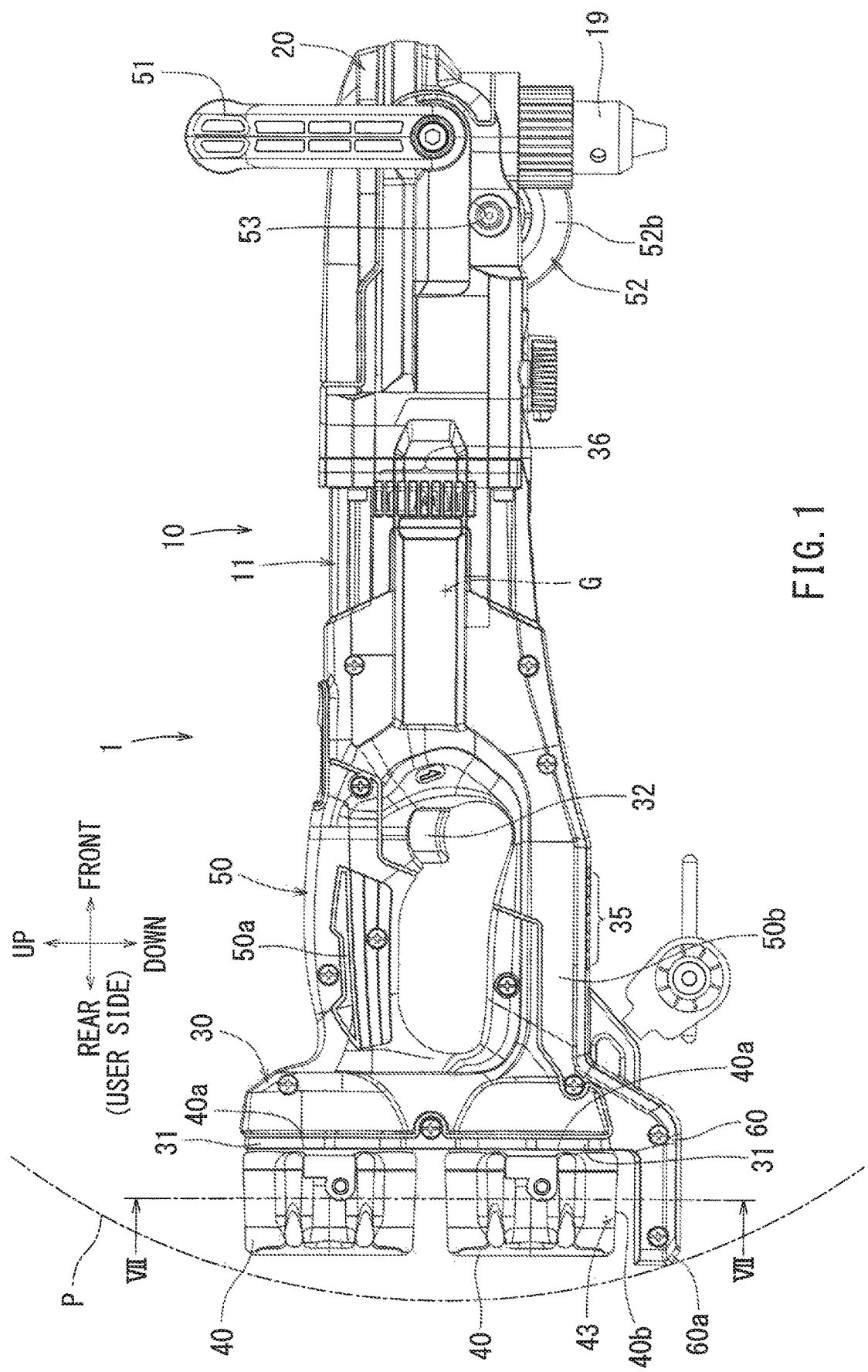
FIG. 1 is a right side view of an electrical apparatus according to a present embodiment.

Representative, non-limiting embodiments according to the present disclosure will now be described with reference to the FIGS. 1 to 8. An electrical apparatus 1 may be, for example, an angle drill having a spindle axis (output axis) intersecting a motor axis. As shown in FIG. 1, the electrical apparatus 1 may include a main housing 10, a gear head 20 and a battery base 30. The main housing 10 may include a motor housing 11, in which an electric motor 12 with a rated voltage of 36V is housed, driven by a battery or batteries used as a power source, which are described infra. The gear head 20 may be formed at a front portion of the main housing 10. The battery base 30 may include two battery attachment portions 31 located at the rear portion the main housing 10.

As shown in FIG. 1, each battery 40 is detachably attached to each battery attachment portion 31. A battery 40 may be a reusable rechargeable lithium ion battery with an output voltage of 18V, which can be charged by a separate dedicated charger. The main housing 10 may have a loop-shaped portion including a grip portion 50. The grip portion 50 may be an upper portion of the loop-shaped portion wherein the loop-shaped portion is located to the rear of the motor housing 11 and in front of the battery base 30. The grip portion 50 and the loop-shaped portion may extend in the rear-to-front direction parallel to the motor axis.

Figure 2:
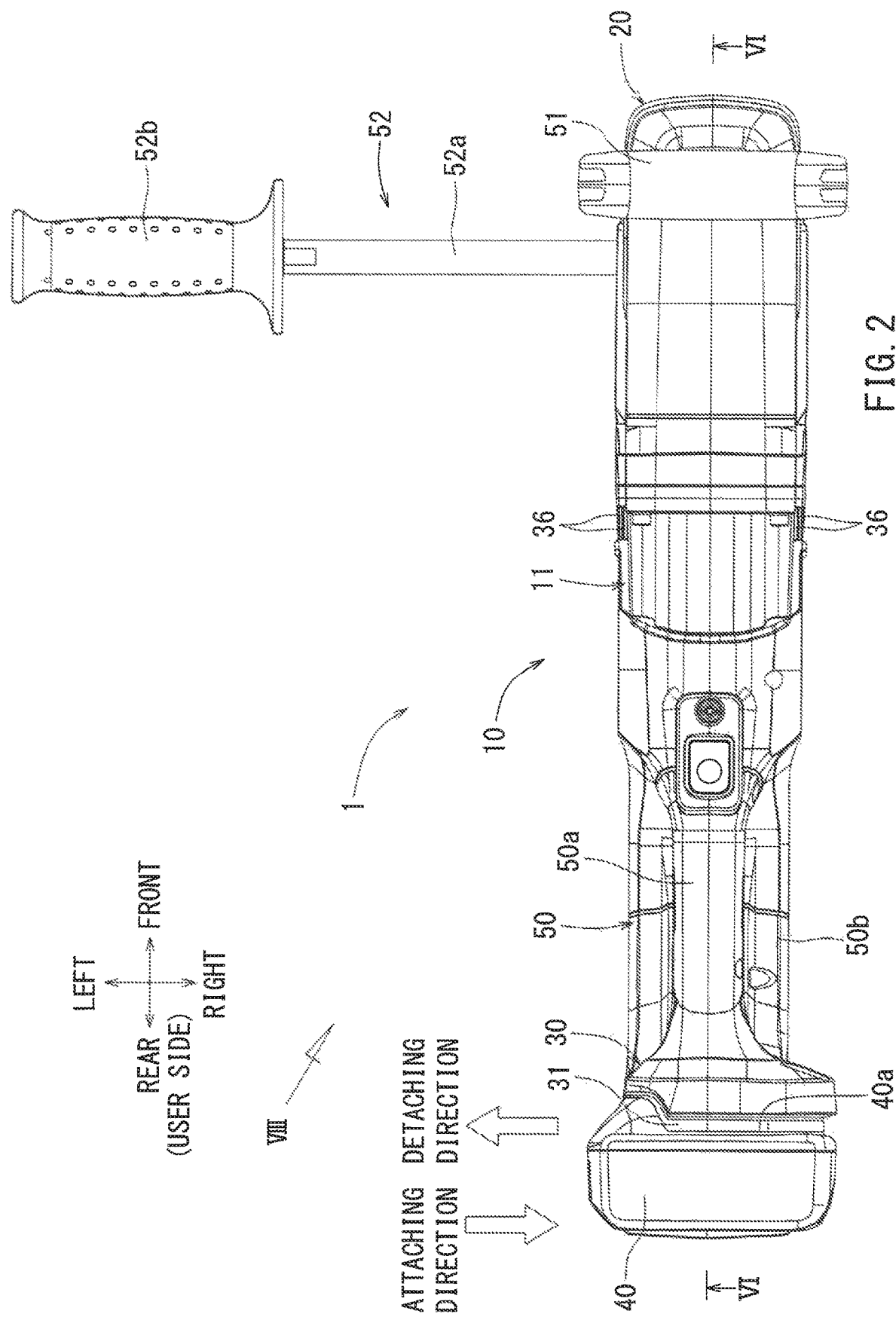
FIG. 2 is a plan view of the electrical apparatus.

As shown in FIGS. 1 and 2, the gear head 20 may be provided with a loop-shaped front grip 51. The front grip 51 may be located at a front portion of the gear head 20 and extend in the left-to-right direction above the gear head 20. A rod-shaped side grip 52 may be provided at the front portion of the main housing 10. The grip portion 50, the front grip 51 and the side grip 52 may all serve as portions with which a user may grasp the electrical apparatus 1. Front-to-rear, right-to-left, and up-to-down directions of the components and/or structures as will be described below are determined relative to the user.

Figure 6:
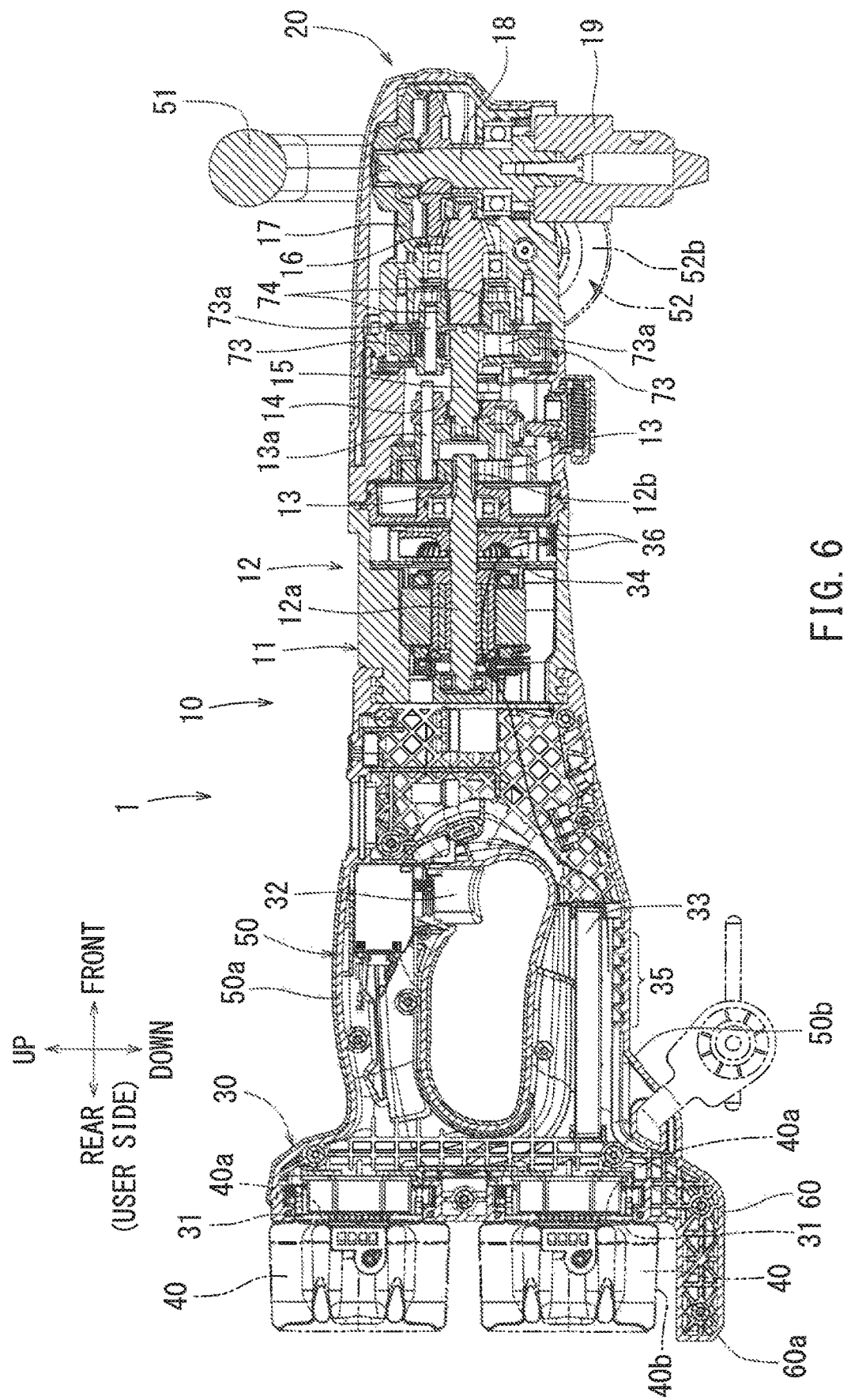
FIG. 6 is a vertical sectional view of the electrical apparatus taken along line VI-VI in FIG. 2 as viewed from the side indicated by arrows.

As shown in FIG. 6, the motor housing 11 includes an electric motor 12 whose motor shaft axis extends in a longitudinal direction (front-rear direction) of the main housing 10. An output shaft 12a of the electric motor 12 rotatable about its longitudinal axis may be mounted to the motor housing 11. A drive gear 12b may be provided at the front end of the output shaft 12a. A plurality of the first planetary gears 13 mesh with the drive gear 12b to revolve around the axis of the output shaft 12a. The plurality of the first planetary gears 13 may be mounted to a first carrier 14 via each pin 13a extending in the front-rear direction. The first carrier 14 is therefore rotatable around the same axis about which output shaft 12a rotates. Inner teeth may be formed on the inner periphery of the first carrier 14 and the inner teeth may mesh with a rear portion of an intermediate gear 15.

As shown in FIG. 6, the intermediate gear 15 is rotatably supported by the gear head 20 such that it rotates about the same longitudinal axis in the rear-to-front direction as that of the output shaft 12a. A plurality of second planetary gears 73 revolving around said axis of the intermediate gear 15 may mesh with the front portion of the intermediate gear 15. Each second planetary gear 73 may be mounted to a second carrier 74 via each pin 73a extending in the front-rear direction. The second carrier 74 is therefore in turn rotatable around the same axis as that of the intermediate gear 15. Inner teeth may be formed on the inner periphery of the second carrier 74 and the inner teeth may mesh with a rear portion of a drive-side bevel gear 16. The drive-side bevel gear 16 is rotatable about the same longitudinal axis as that of the intermediate gear 15, in the front-to-rear direction. A front portion of the drive-side bevel gear 16 may mesh with the driven-side bevel gear 17. The driven-side bevel gear 17 may be fixed to the spindle 18.

As shown in FIG. 6, the spindle (output portion) 18 is provided at the front end of the gear head 20 and is rotatably supported such that its axis of rotation is orthogonal to (intersecting) the longitudinal axis of the output shaft 12a. A chuck 19 may be provided below the bottom distal end of the spindle 18 to which a bit tool such as a drill bit can be attached. A lower portion of the chuck 19 (a portion where the bit tool is attached) may extend downward from the gear head 20. According to the above structure, the bit tool attached to the spindle 18 via the chuck 19 rotates about the same axis as the spindle 18 when the electric motor 12 is driven. In this way, drilling operation may be performed utilizing the bit tool.

As shown in FIG. 1 and FIG. 6, a battery base 30 to which the batteries 40 are attached is provided at the rear portion of the main housing 10. The battery base 30 may have a substantially flat plate shape wherein the plane of said shape extends in a direction orthogonal to the output shaft 12a. The battery base 30 may include two battery attachment portions 31 arranged in a vertical direction. Each battery 40 may be attached to each battery attachment portion 31 where attachment surfaces 40a of the batteries 40 are oriented in the forward direction.

Figure 4:
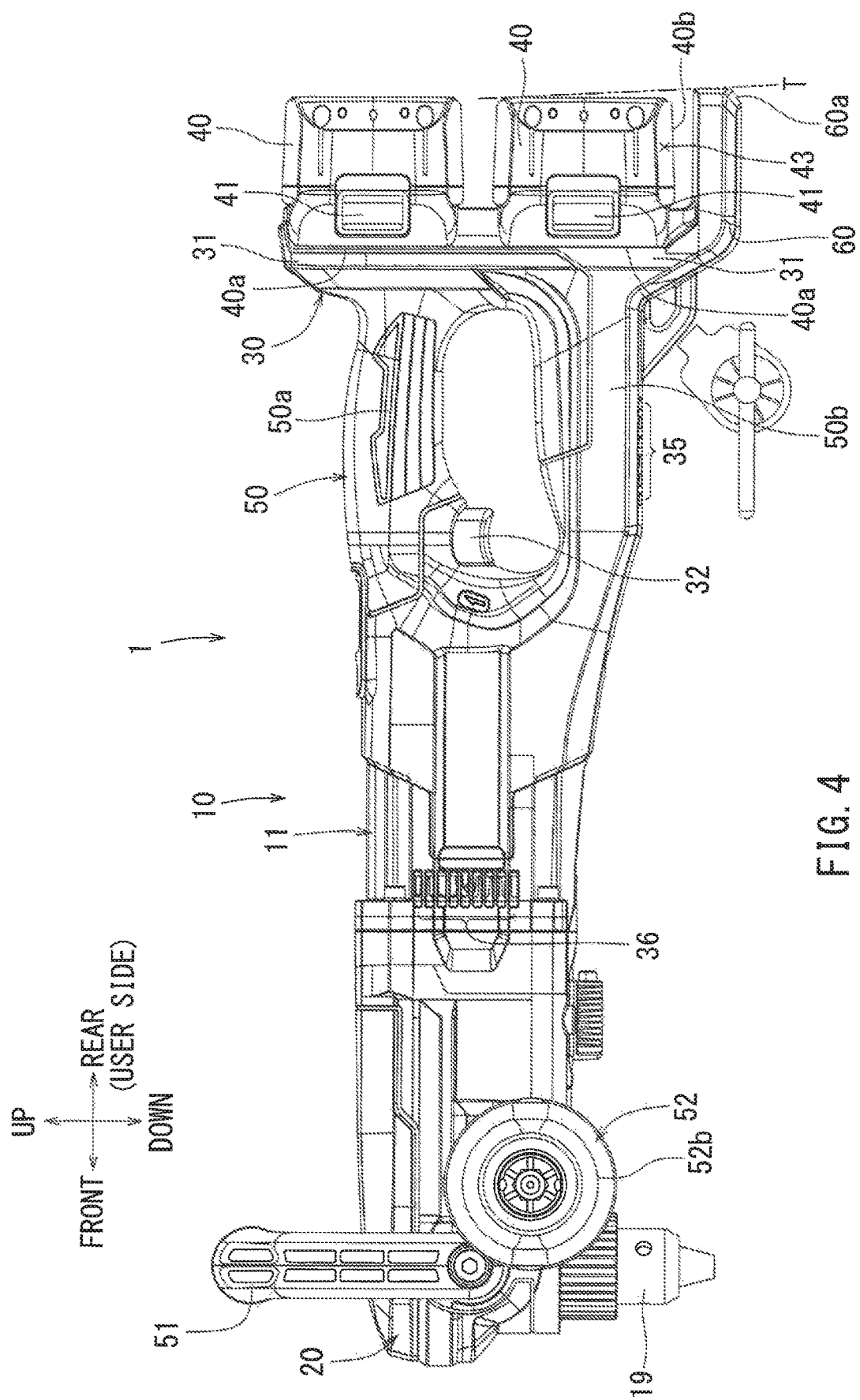
FIG. 4 is a left side view of the electrical apparatus.

As indicated by the labelled void arrows in FIG. 2, the batteries 40 are slidably moved in the left-to-right directions onto the battery attachment portions 31 of the electrical apparatus 1 so that the batteries 40 can be attached to said portions 31. As shown in FIG. 4, an unlock button 41 is provided on the left side (the surface shown in the left side view of the device in FIG. 4 which faces the viewer, corresponding to the leftmost surface of the battery in an attaching direction as shown in FIG. 2) of each battery 40. The unlock buttons 41 may be integrally formed with lock claws (not shown) protruding from the attachment surface 40a. The lock claws may be biased by a spring to protrude rearward from the attachment surface 40a to the exterior. The batteries 40 may be locked to the battery attachment portions 31 when said lock claws protruding rearward engage with the engagement recesses formed in the battery attachment portions 31.

As shown in FIG. 4, the lock claws are pulled frontward into the inside of the attachment surfaces 40a against the biasing force of the aforementioned spring when the unlock buttons 41 are pushed. With the claws retracted in this position, the batteries 40 can then be removed from the battery attachment portions 31 such that the engagement between the lock claws and the battery attachment portions 31 is released. As indicated by the labelled void arrows in FIG. 2, the batteries 40 can be removed from the battery attachment portions 31 when the batteries 40 are slid outward in the right-to-left direction relative to the battery attachment portions 31 while the unlock buttons 41 are concomitantly pushed.

Figure 3:
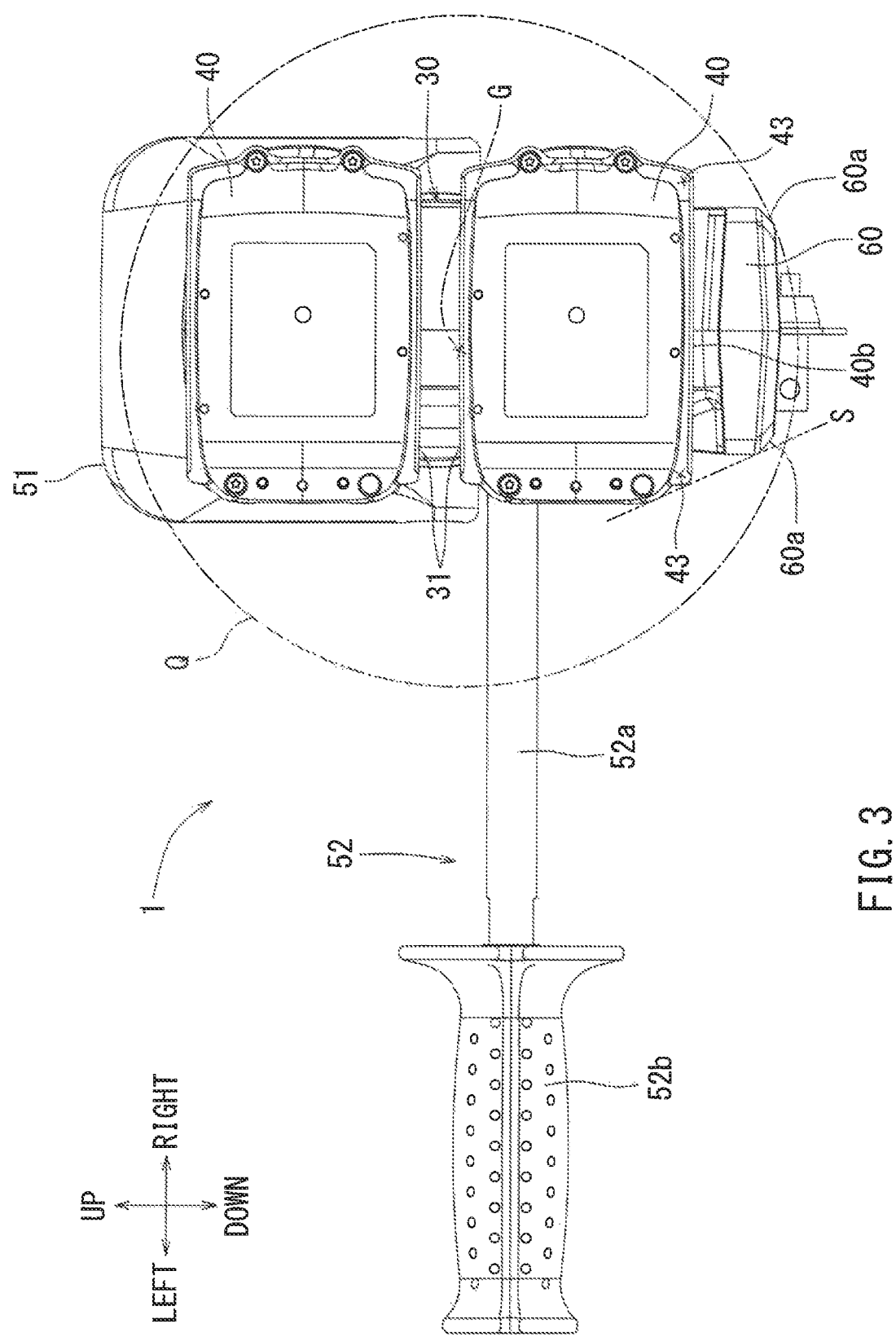
FIG. 3 is a rear view of the electrical apparatus.
Figure 7:
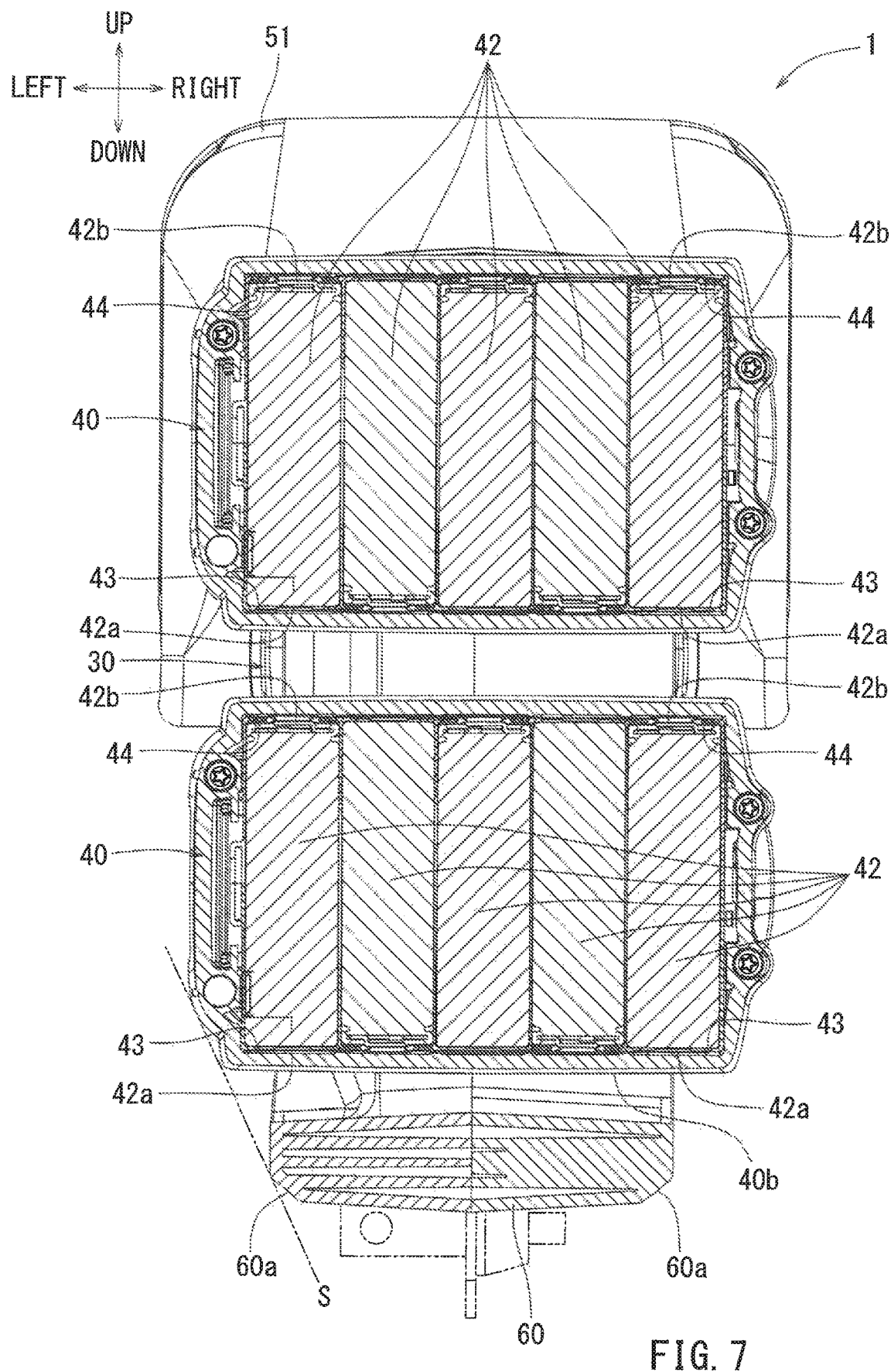
FIG. 7 is a sectional view taken along line VII-VII in FIG. 1 as viewed from the side indicated by the arrows next to said line in FIG. 1, where said view is a vertical sectional view of a plane passing through each central axis of each cell of a plurality of cells provided within batteries attached to the electrical apparatus.

As shown in FIGS. 3 and 6, a user is able to grasp the electrical apparatus 1 in a well-balanced manner when the entire center of gravity of the electrical apparatus 1 is shifted to the rear side, which occurs in this case by providing the battery attachment portions 31 at the rear portion of the main housing 10. The width in the right-to-left direction of the battery attachment portion 31 is minimized since the batteries 40 are arranged side by side in a vertical direction. As a result, having a small width in this manner can prevent collisions the battery attachment portions 31 and the batteries 40, collectively, with other components that may be in the vicinity of the exterior environment of the device in the right-left direction during operation of the electrical apparatus 1 when the electrical apparatus 1 laterally oscillates due to the counter torque to the spindle 18. As mentioned, the batteries 40 are attached to the battery attachment portions 31 by being slid into said portions 31 in the left to right direction. With this configuration, the batteries 40 can be attached to the battery attachment portions 31 in a one-handed operation, such as with the left-hand, if the user is right-handed. In this case, while the user grasps the grip portion 50 with his or her right hand, the battery can be slid into the battery attachment portion 31 with only using the left hand, where said battery attachment can therefore occur without being interrupted by the user's right hand As shown in FIG. 7, a plurality of cells 42 are arranged within each of the batteries 40. Each cell 42 has a can shape. A negative electrode side end face 42a of each cell corresponds to a bottom portion of the can (can shape). Similarly, the positive electrode side end face 42b corresponds to a cover portion of the can, which covers the opening of the can. A sealing structure may be provided at each of the positive electrode side end faces 42b for sealing the opening of the corresponding can as well as for preventing the cover portion from being removed from the can. The negative electrode side end faces 42a may have a lower tensile strength than that of the positive electrode side end faces 42b.

As shown in FIG. 7, the plurality of battery cells 42 are arranged in parallel, side by side, in the batteries 40. Each of the batteries 40 have a plurality of negative electrode side holding portions 43 opposing each of the negative electrode side end faces 42a of the cells 42 in the up-down direction, as well as a plurality of positive electrode side holding portions 44 opposing each of the positive electrode side end faces 42b of the cells 42 in the up-down direction. The negative electrode side holding portions 43 and the positive electrode side holding portions 44 for each cell may be alternately positioned side-by-side in the right-left direction, at the bottom and top of the plurality of cells, as shown in FIG. 7. Due to the low tensile strength of the negative electrode side holding portions 43 as mentioned, the cells 42 within the batteries 40 are more easily deformed or damaged when impact is applied from the outside to the negative electrode side holding portions 43 compared to the case when an equal impact is applied to the positive electrode side holding portions 44. The negative electrode side holding portions 43 of the cells 42 may be located near corners that are positioned at the lower right and lower left corners of the batteries 40, respectively, when the batteries 40 are attached to the battery attachment portions 31.

As shown in FIG. 1, the grip portion 50 may be located between the motor housing 11 and the battery base 30 in the front-rear direction. The grip portion 50 may be integrally formed with the battery base 30, and may be positioned such that it is formed frontward from the front portion battery base 30. The grip portion 50 may be formed to have a loop-shape extending in a longitudinal direction (front-rear direction) of the main housing 10 as seen from a side view. A part of the grip portion 50 may be covered with an elastomer material, wherein said material is integrally formed with the grip portion 50. The elastomer material may cover the outer periphery of an upper grip portion 50a corresponding to an upper half of the loop-shape an upper surface of a lower grip portion 50b corresponding to a lower half of the loop-shape, and a front surface of the battery base 30. As a result, with the elastomer covering a significant portion of the loop shape, a user can easily grasp the device by gripping the upper grip portion 50a.

As shown in FIGS. 1, 2 and 6, a loop-shaped front grip 51 is rotatably attached to an upper portion of the gear head 20. The front grip 51 may extend in the right-left direction, intersecting both the axis of the output shaft 12a and the axis of the spindle 18. The front grip 51 may be rotatable in the plane comprising front-rear and up-down directions about a connecting portion between the front grip 51 and the gear head 20 in the left-right direction as an axis. Consequently, the front grip 51 may be able to rotate from a front position to the front of the gear head 20, to a rear position above a position to the rear of the gear head 20, through an intermediate position comprising an upper position being directly above the axis of rotation of the gear head 20. In this manner, the extent to which front grip 51 can rotate is in a range of about 135 degrees from the position of about 0 degree (front position) relative to the rear-front horizontal line corresponding to the motor axis at the left-right axis of rotation about which front grip 51 rotates, to the rear position. The front grip 51 shown in the drawings is positioned at the intermediate upper position of about 90 degrees relative to the horizon.

The front grip 51 may be held at 7 locations (angles) within the above-mentioned angle range. FIG. 1 shows the front grip 51 held at the intermediate upper position of 90 degrees relative to the horizon. Therefore, in this manner, the front grip 51 may be arranged and held at desired position where the user can stably hold the electrical apparatus 1 in accordance with a working environment. For example, the front grip 51 may be set at a position at nearly 0 degrees relative to the horizon, i.e. where the front grip 51 is positioned near the front position when the vertical workspace is narrow. The front grip 51 also may be set at an angular position equal to or more than 90 degree relative to the horizon when the workplace such as an area close to a wall where a space in a front direction is narrow. The grip portion 51 may be rotatably held to the gear head 20 by screw connections, wherein the grip portion 51 may be rotatable about the axis in the left-right direction formed by screws, when screwing in the grip portion 51 into the gear head 20.

As shown in FIGS. 1 to 3 and 6, the rod-shaped side grip 52 is provided at the front portion of the main housing 10. The side grip 52 may extend in a leftward from the lateral side of the main housing 10 i.e. in a left-right direction intersecting both the axes of the output shaft 12a in the rear-front direction as well as of the spindle 18 in the up-down direction. The side grip 52 may include a columnar metal pole 52a extending outward in the left-right direction from the main housing 10 and a rubber grip 52b provided at the outer end of the pole 52a. The outer peripheral surface of the rubber grip 52b may be covered with an elastomer material and serve as a grip portion for a user. The pole 52a may be attached to and extend outward from one of the side grip attachment portions 53 provided at left front and right front portions of the main housing 10, respectively.

Figure 5:
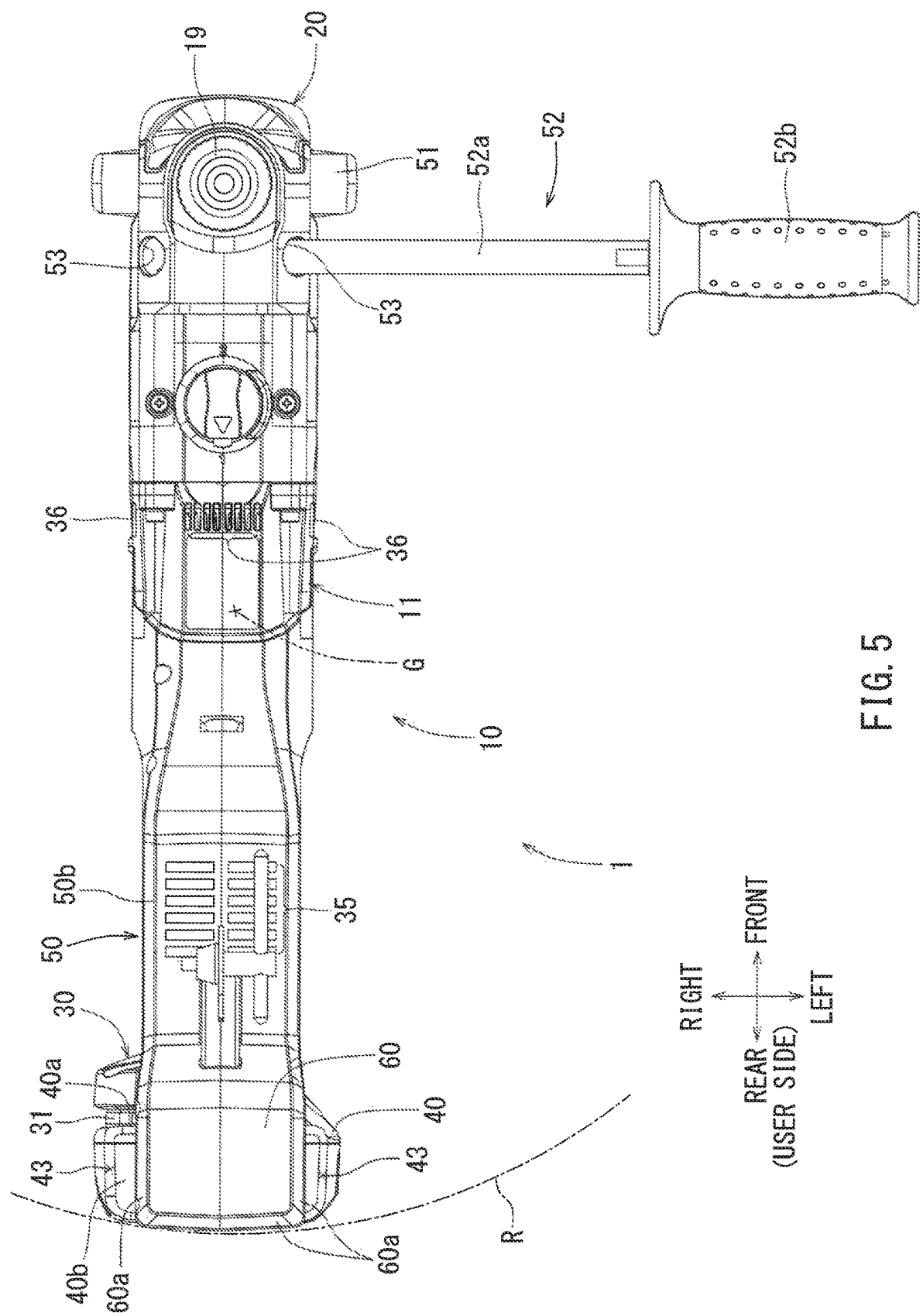
FIG. 5 is a bottom view of the electrical apparatus.

The side grip 52 in the drawings FIGS. 2, 5, and 6 is attached to the left side grip attachment portion 53. The side grip 52 serves as a grip for a user when the workplace is narrow in the vertical direction to the extent that the front grip 51 cannot be grasped. Further, if the side grip 52 abutting a wall, this configuration can also serve as a reaction force-receiving shock-absorbing portion for the rotational reaction force applied to the electrical apparatus 1 when the bit tool collides a hard material and stops.

As shown in FIG. 6, a switch lever 32 is provided on the front lower surface of the upper grip portion 50a. The electric motor 12 is driven when the switch lever 32 is pulled upward by the fingertips of the user to operate the apparatus 1 while said user grasps the upper grip portion 50a. The switch lever 32 protrudes downward from the upper grip portion 50a due to biasing force of a spring, and consequently, due to said biasing force, the electric motor 12 stops when the switch lever 32 is no longer being pulled upward to operate the apparatus 1. A controller 33 in the shape of a strip plate may be installed in the lower grip portion 50b. The controller 33 may be provided with a control circuit for the electric motor 12 comprising a microcomputer, a drive circuit composed of an FET for adjusting the current of the electric motor 12, and an automatic stop circuit configured to detect the power supply condition of the batteries 40 and configured to cut off power supply to the electric motor 12 accordingly, when detecting an over discharged state or an overcurrent state etc.

As shown in FIG. 6, a blower fan 34 is provided integrally with the output shaft 12a toward the front portion of the output shaft 12a. The blower fan 34 also rotates about the same axis as the electric motor 12, rotating about the output shaft 12a. The rotation of the blower fan 34 may generate an air flow flowing from the rear to the front of the main housing 10.

As shown in FIGS. 1 and 4 to 6, a plurality of intake ports 35 is provided below the controller 33 at a bottom surface of the lower grip portion 50b. A plurality of exhaust ports 36 is provided at a right wall, a left wall and a bottom surface of the motor housing 11 corresponding to the outer radial circumferential periphery of the blower fan 34. As indicated by a solid arrow in FIG. 6, an air passage is formed from the intake ports 35, through the electrical apparatus 1, and to the exhaust ports 36 within the main housing 10. The air may enter the main housing 10 through the intake ports 35 due to the suction force by the blower fan 34 and be exhausted to the outside of the main housing 10 through the exhaust port 36 through the air passage and the blower fan 34. Since the electric motor 12 and the controller 33 are arranged on the flow path of air within the main housing 10, the air blown through the apparatus 1 by the blower fan 34 may in this way cool the electric motor 12 and the controller 33.

As shown in FIG. 6, an extension portion 60 is provided at a rear lower side of the main housing 10. The battery base 30, the extension portion 60 and the grip portion 50 may be made of resin, respectively. The drawings show the structure where the battery base 30, the extension portion 60 and the grip portion 50 are integrally formed. However, each of these may be provided separately as well. The extension portion 60 may extend along the longitudinal direction (front-rear direction) of the main housing 10 and may be configured to have a substantially strip plate shape orthogonal to (intersecting) an up-down axial direction of the spindle 18.

As shown in FIG. 6, the extension portion 60 extends in a rear-front direction intersecting and orthogonal to the battery attachment surface of the battery attachment portion 31. The extension portion 60 includes end portions 60a chamfered in a smoothened sled shape at corners. The batteries 40 attached to the battery attachment portions 31 may be arranged above the extension portion 60, as shown in FIG. 6. As shown in FIG. 1, the predefined vertical space between the lower battery 40 attached to the lower battery attachment portion 31 and the extension portion 60 may correspond to the thickness of the extension portion 60 in a thickness direction (up-down direction) of the extension portion 60.

Figure 8:
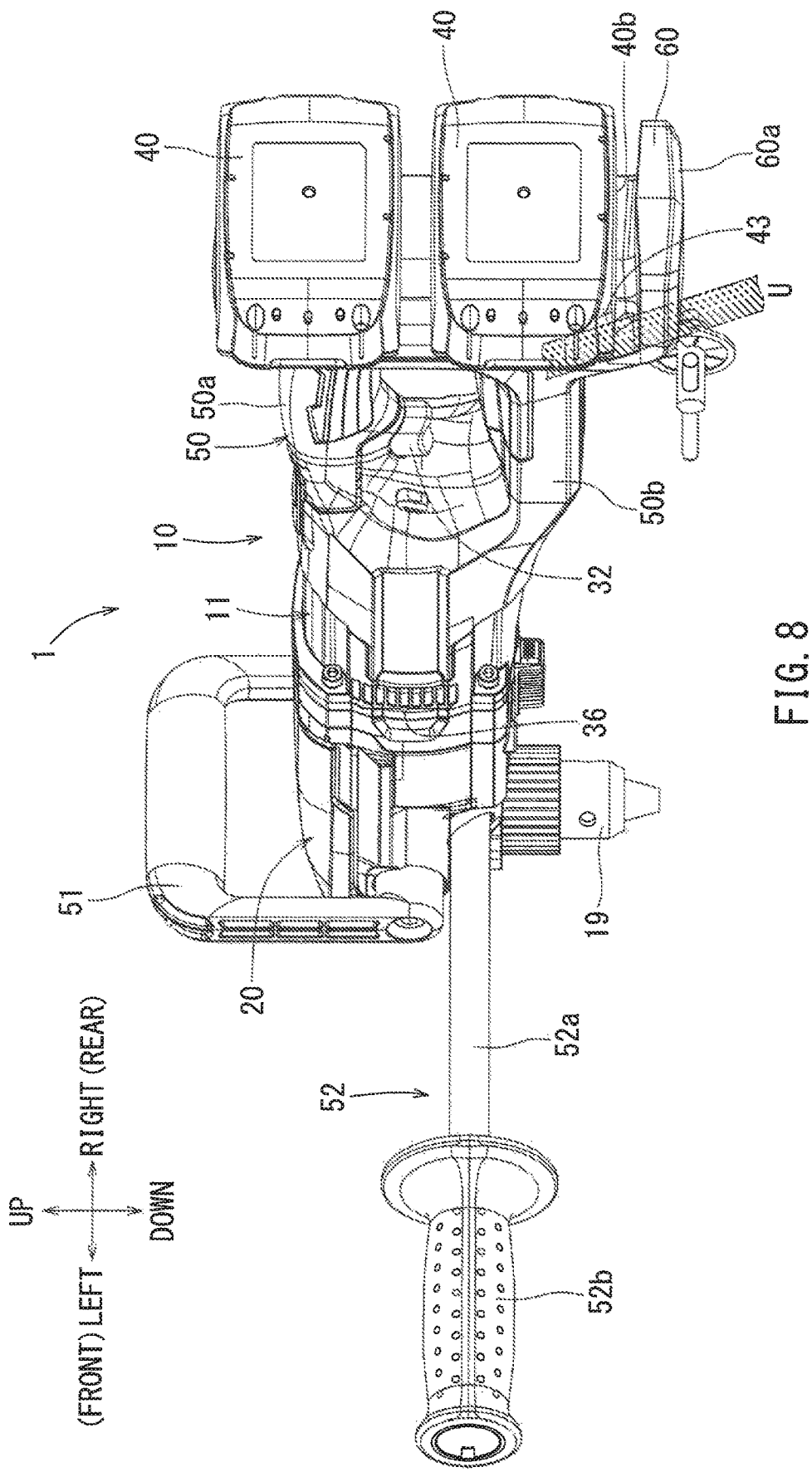
FIG. 8 is a perspective view of the electrical apparatus as viewed from a direction indicated by an arrow VIII in FIG. 2.

As shown in FIGS. 3, 4, 7 and 8, the extension portion 60 has a shape configured to protect the negative electrode side holding portions 43. Specifically, as shown in FIGS. 3 and 7, the negative electrode side holding portions 43 may be located closer to the inner region of extension portion 60 than the tangent line S that connects a left edge of the extension portion 60 and the left edge of the battery 40. As shown in FIG. 4, the negative electrode side holding portion 43 may be located closer to the front side of extension portion 60 than the tangent line T that connects the rear edge of the extension portion 60 and the rear edge of the battery 40. As shown in FIG. 8, the negative electrode side holding portion 43 may be located closer to the inner region of the extension portion 60 than the tangential plane U that is tangent to the leftmost front ends of the extension portion 60 and the bottom-most battery 40, respectively. In other words, the negative electrode side holding portion 43 may be located closer to the right and rear of the extension portion 60 than the tangential plane U. As a result, the negative electrode side holding portion 43, being located on the inner region of extension portion 60 rather than the outer region with respect to tangent line S, tangent line T, and tangential plane U, may be prevented from directly receiving a shock by the sides of the extension portion 60 or the batteries 40 (except for the negative electrode side holding portion 43) when the electrical apparatus 1 collides an obstacle or a work surface or is dropped to the ground.

As shown in FIGS. 1, 3 and 5, the corners of the battery 40 corresponding to the outer side of the negative electrode side holding portions 43 are located closer to the inner side (side of the center of gravity G) than the end portions 60a of the extension portion 60. The end portions 60a of the extension portion 60 are located the farthest away from the center of gravity G of the electrical apparatus 1. The negative electrode side end faces 42a of the battery cells 42 may be arranged close to the corners of the battery 40. In FIG. 1, a circular arc P about the center of gravity G is shown, whose radius extends from the center of gravity G to the end portions 60a of the extension portion 60, as they are the component of the electrical apparatus 1 located farthest away from the center of gravity G. Thus, the corners of the battery 40 corresponding to the outer side of the negative electrode side holding portions 43 may be positioned closer to the inner region (center of gravity G side) in the up-down and rear-front directions than the circular arc P.

Similarly, FIG. 3 shows a circular arc Q about the center of gravity G whose radius extends to the end portions 60a of the extension portion 60 located farthest away from the center of gravity G. The corners of the battery 40 may be located closer to the inner region (center of gravity G side) in the left-right and up-down directions than the circular arc Q. Similarly, FIG. 5 shows a circular arc R about the center of gravity G whose radius extends to the end portions 60a of the extension portion 60, as they are the components of electrical apparatus 1, located farthest away from the center of gravity G. Two corners of the battery 40 corresponding to the outer side of the negative electrode side holding portions 43 may be positioned closer to the inner region (center of gravity G side) than the circular arc R in the left-right and rear-front directions. Accordingly, FIGS. 1, 3, and 5 collectively indicate that two corners of the battery 40 where the negative electrode side end face 42a are arranged may be positioned within a spherical surface about the center of gravity G whose radius extends to the end portions 60a of the extension portion 60 located farthest away from the center of gravity G.

As shown in FIGS. 1 and 3, the battery 40 attached to the lower battery attachment portion 31 has a facing work surface 40b as a lower surface. The facing work surface 40b may directly oppose the work surface of the electrical apparatus 1 when no extension portion 60 is provided. Therefore, the facing work surface 40b may be prevented from directly coming in contact with the work surface by providing the extension portion 60 between the facing work surface 40b and the work surface when, for example, the electrical apparatus 1 moves downward while, for example, the bit tool drills through a material by drilling a hole(s).

According to the electrical apparatus 1 configured as above, the extension portion 60 may be formed integrally with the grip portion 50 provided at the main housing 10 as well as with the battery base 30 as shown in FIG. 6, where all said components are made of resin. As a result, with such a one-piece construction the cost for providing the extension portion 60 may be reduced while the weight of the extension portion 60 may be made to be lightweight.

As shown in FIG. 6, the extension portion 60 may be provided on the work surface side of the bit tool (lower than the spindle 18 in an axial direction) with respect to the battery 40 attached to the battery attachment portion 31. For example, the electrical apparatus 1 may move in the working direction (downward) due to the force caused when the bit tool drills through a material by drilling a hole(s) and collides the working surface. With the electrical apparatus 1 according to the present embodiment, the battery 40 attached to the lower battery attachment portion 31 includes the facing work surface 40b opposed to the work surface if the extension portion 60 was not present. By providing the extension portion 60, then, the facing work surface 40b is prevented from colliding with the upper surface of the work surface when the electrical apparatus 1 moves in the working direction.

As shown in FIG. 1, the negative electrode side holding portions 43 of the battery 40 configured to hold the easily deformable negative electrode side end faces 42a of the battery cells 42 can be protected by the extension portion 60 from a collision etc. The extension portion 60 can protect the fragile corners of the battery 40 from a collision etc. Accordingly, the easily deformable negative electrode side end face 42a, which is arranged close to the corners of the battery 40, can be protected. The extension portion 60 may be provided in a minimally sized configuration so as to be able to protect the negative electrode side holding portions 43.

As shown in FIG. 1, an predefined vertical space may be provided between the lowermost battery 40 attached to the battery attachment portion 31 and the extension portion 60. The size of the space is defined to substantially correspond to the thickness of the extension portion 60. Due to said structural configuration and this specific sizing scheme, a battery with a greater size than the battery 40 may be attached to the battery attachment portion 31. As shown in FIG. 1, a rear end of the extension portion 60 may be in substantially the same position in the front-rear direction as the rear end of the battery attached to the battery attachment portion 31. Accordingly, the electrical apparatus 1 may be vertically oriented such that the electrical apparatus 1 may be arranged with the battery base 30 side as the lower side.

With the electrical apparatus 1 according to the present embodiment, the corners of the battery 40 where the negative electrode side end faces 42*a* of the battery are closely arranged may be located closer to the inner region (gravity center side) than the ends 60*a* of the extension portion 60 located farthest away from the center of gravity G of the electrical apparatus 1. Therefore, it is possible to prevent the entire weight of the electrical apparatus 1 from being directly and intensively applied to the corner of the battery 40 where the negative electrode side end face 42*a* of a cell 42 is disposed when, for example, the electrical apparatus is dropped. As a result, the fragile corners of the battery 40 as well as the negative electrode side end faces 42*a* can be prevented from being damaged.

Various modifications may be made to the above-illustrated embodiments. For example, an arrangement with two lithium ion batteries with an output voltage of 18V has been illustrated, however, other arrangements may be adopted in which various numbers of batteries with various respective output voltages may be attached. Further, such a modification is not limited to lithium ion batteries but the various other kinds of the batteries also. For example, batteries such as a nickel-cadmium battery may be attached. Further, though an electrical apparatus 1 with one extension portion 60 at the rear lower side of a main housing 10 has been illustrated, the extension portion may be positioned at any desired appropriate locations, where any desired number of extension portions may be provided if batteries can be protected.

An angle drill used for drilling a hole(s) has been illustrated as the electrical apparatus, however, the above structure may be similarly adopted to various other electrical apparatuses such as a hammer drill, a grinder, a plane and/or a chainsaw etc. Further, the above structure may similarly be adopted to apparatuses other than the mentioned electrical apparatuses, such as a dust collector, a cleaner, a blower, a work light, a radio and/or a speaker in which a part of the battery can be attached in an exposed state.

The various examples described above in detail with reference to the attached drawings are intended to be representative of the disclosure and thus non limiting embodiments. The detailed description is intended to teach a person of skill in the art to make, use and/or practice various aspects of the present teachings and thus does not limit the scope of the disclosure in any manner. Furthermore, each of the additional features and teachings disclosed above may be applied and/or used separately or with other features and teachings in any combination thereof, to provide improved electric apparatuses, and/or methods of making and using the same.

What is claimed is:

1. An electrical apparatus comprising:
   a main housing configured to accommodate an electric motor;
   an output portion configured to be driven by the electric motor and to which a bit tool can be attached; and
   one or more battery attachment portions to which one or more batteries can be attached;
   wherein the main housing includes an extension portion that extends in a direction that intersects the direction in which a battery attachment surface of the one or more battery attachment portions extends so as to overlap and cover at least a portion of the one or more batteries, when the one or more batteries are attached to the battery attachment surface, in the direction in which the battery attachment surface extends, and the extension portion is integrally formed with the main housing.

2. The electrical apparatus of claim 1, wherein the extension portion is configured to protect the one or more batteries attached to the one or more battery attachment portions.

3. The electrical apparatus of claim 1, further comprising a clearance space provided between the extension portion and the one or more batteries attached to the one or more battery attachment portions, wherein the clearance space allows another one or more batteries of a size larger than the one or more batteries attached to the one or more battery attachment portions to be attached to the one or more battery attachment portions.

4. The electrical apparatus of claim 1, wherein the one or more batteries accommodate at least two battery cells which each includes a negative electrode side end face, wherein the one or more batteries have at least two corners wherein at least one of the negative electrode side end faces is arranged close to each of the corners, and
   wherein the extension portion is configured to protect the two corners.

5. An electrical apparatus comprising:
   a main housing configured to accommodate an electric motor;
   one or more battery attachment portions provided at a rear region of the main housing, wherein one or more batteries can be attached to the one or more battery attachment portions; and
   a spindle (1) provided at a front region of the main housing. (2) configured to be driven by the electric motor, and (3) having a working end to which a bit tool can be attached, the spindle connected to the electric motor via a bevel gear so that the spindle can rotate about an axis which intersects a motor axis of the electric motor;
   wherein the main housing includes an extension portion that extends in a direction which intersects the direction in which a battery attachment surface of the one or more battery attachment portions extends so as to overlap and cover at least a portion of the one or more batteries, when the one or more batteries are attached to the battery attachment surface, in the direction in which that battery attachment surface extends, and
   wherein the extension portion is located on a working end side of the bit tool with respect to the one or more batteries.

6. The electrical apparatus of claim 5, wherein the extension portion is configured to protect the one or more batteries attached to the one or more battery attachment portions.

7. The electrical apparatus of claim 5, further comprising a clearance space provided between the extension portion and the one or more batteries attached to the one or more battery attachment portions, wherein said clearance space allows another one or more batteries of size larger than the one or more batteries attached to the one or more battery attachment portions to be attached to the one or more battery attachment portions.

8. The electrical apparatus of claim 5, wherein the one or more batteries accommodate at least two battery cells which each includes a negative electrode side end face, wherein the one or more batteries have at least two corners wherein at least one of the negative electrode side end faces is arranged close to each of the corners, and wherein the extension portion is configured to protect the two corners.

9. An electrical apparatus comprising:
   a main housing;

one or more battery attachment portions to which one or more batteries can be attached such that at least a part of the one or more batteries is exposed to the exterior of the main housing;

wherein the main housing includes an extension portion that extends in a direction that intersects the direction in which a battery attachment surface of the one or more battery attachment portions extends so as to overlap and cover at least a portion of the one or more batteries, when the one or more batteries are attached to the battery attachment surface, in the direction in which the battery attachment surface extends, wherein the one or more batteries have battery cells in their interior, where the each of said one or more batteries includes a negative electrode side holding portion designed to cover at least one of negative electrode side end faces of the battery cells, and wherein the negative electrode side holding portion is located closer to an inner region of the extension portion than a plane to which a lateral side of the extension portion and a lateral side of the battery are tangent, when the one or more batteries are attached to the one or more battery attachment portions.

10. The electrical apparatus of claim 9, wherein the extension portion is configured to protect the one or more batteries attached to the one or more battery attachment portions.

11. The electrical apparatus of claim 9, further comprising a clearance space provided between the extension portion and the one or more batteries attached to the one or more battery attachment portions, wherein the clearance space allows another one or more batteries of a size larger than the one or more batteries attached to the one or more battery attachment portions to be attached to the one or more battery attachment portions.

12. The electrical apparatus of claim 9, wherein the one or more batteries accommodate at least two battery cells which each includes a negative electrode side end face, wherein the one or more batteries have at least two corners wherein at least one of the negative electrode side end faces is arranged close to each of the corners, and wherein the extension portion is configured to protect the two corners.

13. An electrical apparatus comprising:
a main housing configured to accommodate an electric motor,
an output portion configured to be driven by the electric motor and to which a bit tool can be attached; and
one or more battery attachment portions to which one or more batteries can be attached;
wherein
the main housing includes an extension portion that extends in a direction that intersects the direction in which a battery attachment surface of the one or more battery attachment portions extends so as to overlap and cover at least a portion of the one or more batteries, when the one or more batteries are attached to the battery attachment surface, in the direction in which the battery attachment surface extends;
the one or more batteries accommodate at least two battery cells which each includes a negative electrode side end face, wherein at least the one of the one or more batteries has at least two corners wherein the negative electrode side end face of each of the battery cells is arranged close to each of the corners; and
at least the two corners at which the negative electrode side end face is arranged are located within a sphere whose radius is from a center of gravity of the electrical apparatus to a point of the extension portion that is farthest away from the center of gravity.

14. The electrical apparatus of claim 13, wherein the outermost end of the extension portion is located farthest away from the center of gravity of said apparatus relative to any other component of the electrical apparatus.

15. The electrical apparatus of claim 14, wherein the outermost end of the extension portion is also its rearmost end, relative to the user.

16. The electrical apparatus of claim 13, such that the main housing also comprises a loop-shaped portion including a grip portion to the rear of the motor.

17. The electrical apparatus of claim 16, such that the extension portion is formed integrally with the grip portion and a battery base to which the battery attachment portions are attached.

18. The electrical apparatus of claim 16, such that a switch lever is provided on the front lower surface of the grip portion, wherein the electric motor is only driven in the apparatus when the switch lever is pulled upward by a user of the device.

19. The electrical apparatus of claim 16, wherein a bottom surface of the grip portion includes a plurality of intake holes, wherein left, right, and lower sides of the main housing in the proximity of the motor includes a plurality of exhaust holes, wherein a blower fan formed integrally with the motor operates to blow air in a flow path from the intake holes to the exhaust holes when the motor is driven.

20. The electrical apparatus of claim 19, wherein a controller including a microprocessor and a drive circuit including an FET is placed above the intake holes on the bottom surface of the grip portion such that it is immediately adjacent to the intake holes such that it is in the flow path of air blown by the blower fan when the motor is driven.

21. A power tool comprising:
an electric motor;
a tool operation mechanism that (1) is located at a first end of a longitudinal axis of the power tool, (2) has a tool operation mechanism axis that intersects the longitudinal axis
and (3) has a working end that retains and drives a tool;
a gear mechanism that converts energy from the electric motor to energy that drives the tool operation mechanism;
a battery attachment portion (1) located at a second end of the longitudinal axis that is opposite the first end and (2) oriented perpendicular to the longitudinal axis such that at least one battery extends from the battery attachment portion in a direction opposite from the first end when the at least one battery is attached to the battery attachment portion;
a housing that houses the electric motor and the gear mechanism and includes an extension portion that extends (1) in a direction parallel to the longitudinal axis and perpendicular to the tool operation mechanism axis and (2) away from the battery attachment portion such that the extension portion overlaps the at least one battery in the direction of the tool operation mechanism axis when the at least one battery is attached to the battery attachment portion.

22. The power tool according to claim 21, wherein the extension portion is configured to overlap the entire length of the at least one battery in the direction of the tool operation mechanism axis.

23. The power tool according to claim 21, wherein the extension portion is located farther from the longitudinal axis than a lowermost end of the tool operation mechanism.

* * * * *